US012056605B2

(12) United States Patent
Cao et al.

(10) Patent No.: US 12,056,605 B2
(45) Date of Patent: Aug. 6, 2024

(54) SYSTEM AND METHOD FOR IMPROVED NEURAL NETWORK TRAINING

(71) Applicant: ROYAL BANK OF CANADA, Montreal (CA)

(72) Inventors: Yanshuai Cao, Toronto (CA); Yik Chau Lui, Toronto (CA); Weiguang Ding, Toronto (CA); Ruitong Huang, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 1147 days.

(21) Appl. No.: 16/172,451

(22) Filed: Oct. 26, 2018

(65) Prior Publication Data

US 2019/0130266 A1   May 2, 2019

Related U.S. Application Data

(60) Provisional application No. 62/578,345, filed on Oct. 27, 2017.

(51) Int. Cl.

| G06N 3/08 | (2023.01) |
| G06F 18/21 | (2023.01) |
| G06F 18/214 | (2023.01) |
| G06F 18/2413 | (2023.01) |
| G06N 3/045 | (2023.01) |
| G06N 3/047 | (2023.01) |
| G06N 3/048 | (2023.01) |
| G06N 7/01 | (2023.01) |
| G06V 10/764 | (2022.01) |

(Continued)

(52) U.S. Cl.
CPC ........... *G06N 3/08* (2013.01); *G06F 18/2148* (2023.01); *G06F 18/217* (2023.01); *G06F 18/24133* (2023.01); *G06N 3/045* (2023.01); *G06N 3/047* (2023.01); *G06N 3/048* (2023.01); *G06N 7/01* (2023.01); *G06V 10/764* (2022.01); *G06V 10/776* (2022.01); *G06V 10/82* (2022.01)

(58) Field of Classification Search
CPC ...... G06N 3/08; G06N 3/0481; G06N 3/0454; G06K 9/6257
See application file for complete search history.

(56) References Cited

PUBLICATIONS

Salimans ("Improved Techniques for Training GANs") 30th Conference on Neural Information Processing Systems (NIPS 2016), Barcelona, Spain. (Year: 2016).*

(Continued)

*Primary Examiner* — Kakali Chaki
*Assistant Examiner* — Su-Ting Chuang
(74) *Attorney, Agent, or Firm* — NORTON ROSE FULBRIGHT CANADA LLP

(57) ABSTRACT

A system, electronic device and method for improved neural network training are provided. The electronic device includes: a processor, a memory storing a Generative adversarial network (GAN) to learn from unlabeled data by engaging a generative model in an adversarial game with a discriminator; and one or more programs stored in the memory and configured to be executed by the one or more processors, the one or more programs including instructions for training the Generative adversarial network using a regularizer to encourage the discriminator to properly use its capacity and hidden representations of the discriminator to have high entropy.

21 Claims, 10 Drawing Sheets
(8 of 10 Drawing Sheet(s) Filed in Color)

(51) Int. Cl.
G06V 10/776 (2022.01)
G06V 10/82 (2022.01)

(56) References Cited

PUBLICATIONS

Ioffe ("Batch Normalization: Accelerating Deep Network Training by Reducing Internal Covariate Shift") Proceedings of the 32 nd International Conference on Machine Learning, Lille, France, 2015 (Year: 2018).*

Zhang ("StackGAN: Text to Photo-realistic Image Synthesis with Stacked Generative Adversarial Networks") Proceedings of the IEEE International Conference on Computer Vision (ICCV), 2017, pp. 5907-5915 (Year: 2017).*

Berthelot ("BEGAN: Boundary Equilibrium Generative Adversarial Networks") arXiv:1703.10717v4 [cs.LG] May 31, 2017 (Year: 2017).*

Arora ("Generalization and Equilibrium in Generative Adversarial Nets (GANs)") Proceedings of the 34 th International Conference on Machine Learning, Sydney, Australia, PMLR 70, 2017. (Year: 2017).*

Courbariaux ("Binarized Neural Networks: Training Deep Neural Networks with Weights and Activations Constrained to +1 or −1") arXiv:1602.02830v3 [cs.LG] Mar. 17, 2016 (Year: 2016).*

Zhao ("Energy-based Generative Adversarial Network") Published as a conference paper at ICLR 2017 (Year: 2017).*

Raghu ("On the Expressive Power of Deep Neural Networks") Proceedings of the 34th International Conference on Machine Learning, PMLR 70:2847-2854, 2017. (Year: 2017).*

Warde-Farley ("Improving Generative Adversarial Networks with Denoising Feature Matching") Mar. 3, 2017ICLR 2017 conference Add Revision (Year: 2017).*

Sricharan ("Semi-supervised Conditional GANs") arXiv:1708.05789v1 [stat.ML] Aug. 19, 2017 (Year: 2017) Sricharan teaches unsupervised GAN that the generator generate unlabeled data in Figure 1: (a) Unsupervised GAN.*

* cited by examiner

SYSTEM AND METHOD FOR IMPROVED NEURAL NETWORK TRAINING

CROSS-REFERENCE

This application claims the benefit of and priority to U.S. provisional patent application No. 62/578,345 filed on Oct. 27, 2017, the entire content of which is herein incorporated by reference.

FIELD

The described embodiments generally relate to the field of neural network training. More particularly, embodiments generally relate to the field of neural network training for Generative Adversarial Networks (GANs).

INTRODUCTION

Artificial Neural Networks may be used for every day applications such as recognizing image and speech at levels comparable to humans. Neural networks can learn tasks and features by processing data, which is known as training. Once properly trained, the neural networks can process data for applications, such as face recognition, speech processing, language translation, semiconductor fabrication, biomolecular analysis, and so on. In order to train neural networks, a significant amount of computing resources may be required. For example, training of deep neural networks is generally considered to be time consuming and computationally complex. Training of neural networks is a computationally intensive task. Training of neural networks can use a large amount of processing resources. Training of neural networks can require large scale computational resources being run for days, or even months.

One example of a neural network is Generative Adversarial Networks (GANs). Training GANs in a faster and more robust manner is desired to at least reduce computational complexity.

SUMMARY

In accordance with one aspect, there is provided an electronic device for improved neural network training. The electronic device may include: a processor; a memory storing a Generative Adversarial Network to learn from unlabeled data by engaging a generative model in an adversarial game with a discriminator; and one or more programs stored in the memory and configured to be executed by the one or more processors, the one or more programs including instructions for training the Generative Adversarial Network using a Regularizer to encourage the discriminator to properly use its capacity and hidden representations of the discriminator to have high entropy.

In some embodiments, the Regularizer may encourage each piecewise linear region to contain as few data points as possible so that data points x lie in different regions, $\nabla_x D(x)$ to be diverse.

In some embodiments, the generative model may receive diverse learning signals from $\nabla_x D(x)$ to encourage model capacity usage of the discriminator.

In some embodiments, the Generative Adversarial Network may use an activation pattern as a measure on how and where the discriminator uses its model capacity.

In some embodiments, the regularizer may reduce subtle mode collapse and encourages sample diversity across a wide range of architectures and hyperparameters.

In some embodiments, the Regularizer may use an adaptive number of steps for training the Generative Adversarial Network until convergence.

In accordance with another aspect, there is provided a non-transitory computer-readable storage medium comprising computer-executable instructions for causing a processor to: train a Generative Adversarial Network to learn from unlabeled data by engaging a generative model in an adversarial game with a discriminator; and using a Regularizer to encourage the discriminator to properly use its capacity and hidden representations of the discriminator to have high entropy.

In accordance with yet another aspect, there is provided a computer product with non-transitory computer readable medium storing program code to configure a processor to train an Generative Adversarial Network using a Regularizer to encourage a discriminator to properly use its capacity and hidden representations of the discriminator to have high entropy.

In accordance with still another aspect, there is provided an electronic device comprising: one or more processors; memory; and one or more programs, wherein the one or more program are stored in the memory and configured to be executed by the one or more processors, the one or more programs including instructions for: receiving a text string; processing the text string using a Generative Adversarial Network having a Regularizer to encourage a discriminator to properly use its capacity; and generating an image based on the processing output.

In accordance with one aspect, an electronic device for improved neural network training is provided, the device comprising: a processor; a non-transitory computer-readable medium storing data representative of a generative adversarial network (GAN) to learn from unlabeled data by engaging a generator and a discriminator; and one or more programs, wherein the one or more program are stored in the memory and configured to be executed by the one or more processors, the one or more programs including instructions for: receiving a plurality of training cases; training the generative adversarial network, based on the plurality of training cases, to classify the training cases as real or fake; and executing a regularizer to configure the discriminator to allocate a model capacity evenly.

In some embodiments, at least one of the generator and the discriminator is a neural network.

In some embodiments, the discriminator is a rectifier network having an activation function defined as:

$$f(x)=x^+=\max(0,x),$$

where x is input to a neuron of the rectifier network.

In some embodiments, the discriminator is configured to compute a piecewise linear function.

In some embodiments, the regularizer is defined as:
$R_{SBRE}$ applied on a given layer comprising two terms defined on $\{s1, \ldots, s_k\}$: $R_{SBRE}=R_{ME}+R_{AC}$, where $$R_{ME} = \frac{1}{d}\sum_{k=1}^{d} \bar{s}_{(k)}^2; \text{ and}$$

$$R_{AC} = avg_{i \neq j} |s_i^T s_j|/d,$$

where $\bar{s}_{(k)}$ is the average of the sign function on the $k^{th}$ hidden unit across generated data, and $avg_{i \neq j}$ denotes the average taken over all possible pairs of (i; j) such that i≠j.

In some embodiments, the regularizer is configured to encourage each piecewise linear region of the discriminator to contain as few data points as possible so that data points represented by x lie in different regions and that $\nabla_x D(x)$ is diverse, where D(x) is represented by $x^+ = \max(0, x)$.

In some embodiments, the plurality of training cases transmitted to the discriminator comprise real data and fake data.

In some embodiments, the plurality of training cases transmitted to the discriminator comprise interloped real and fake data.

In some embodiments, the regularizer is applied to the immediate pre-nonlinearity activities on one or more layers of the discriminator model.

In some embodiments, the regularizer is applied on generated data and random interpolation inbetween real and generated fake data.

In accordance with some aspects, a computer-implemented method is provided, the method comprising: receiving a plurality of training cases; training the generative adversarial network, based on the plurality of training cases, to classify the training cases as real or fake; and executing a regularizer to configure the discriminator to allocate a model capacity evenly.

In some embodiments, at least one of the generator and the discriminator is a neural network.

In some embodiments, the discriminator is a rectifier network having an activation function defined as:

$f(x) = x^+ = \max(0, X)$, where x is input to a neuron of the rectifier network.

In some embodiments, the discriminator is configured to compute a piecewise linear function.

In some embodiments, the regularizer is defined as: $R_{SBRE}$ applied on a given layer comprising two terms defined on $\{s1, \ldots, s_k\}$: $R_{SBRE} = R_{ME} + R_{AC}$, where $$R_{ME} = \frac{1}{d}\sum_{k=1}^{d} \bar{s}_{(k)}^2; \text{ and}$$

$$R_{AC} = avg_{i \neq j}|s_i^T s_j|/d,$$

where $\bar{s}_{(k)}$ is the average of the sign function on the $k^{th}$ hidden unit across generated data, and $avg_{i \neq j}$ denotes the average taken over all possible pairs of (i; j) such that i≠j.

In some embodiments, the regularizer is configured to encourage each piecewise linear region of the discriminator to contain as few data points as possible so that data points represented by x lie in different regions and that $\nabla_x D(x)$ is diverse, where D(x) is represented by $x^+ = \max(0, x)$.

In some embodiments, the plurality of training cases transmitted to the discriminator comprise real data and fake data.

In some embodiments, the plurality of training cases transmitted to the discriminator comprise interloped real and fake data.

In some embodiments, the regularizer is applied to the immediate pre-nonlinearity activities on one or more layers of the discriminator model.

In some embodiments, the regularizer is applied on generated data and random interpolation inbetween real and generated fake data.

DESCRIPTION OF THE FIGURES

The patent or application file contains at least one drawing executed in color. Copies of this patent or patent application publication with color drawing(s) will be provided by the Office upon request and payment of the necessary fee.

In the figures, embodiments are illustrated by way of example. It is to be expressly understood that the description and figures are only for the purpose of illustration and as an aid to understanding.

Figure 1:
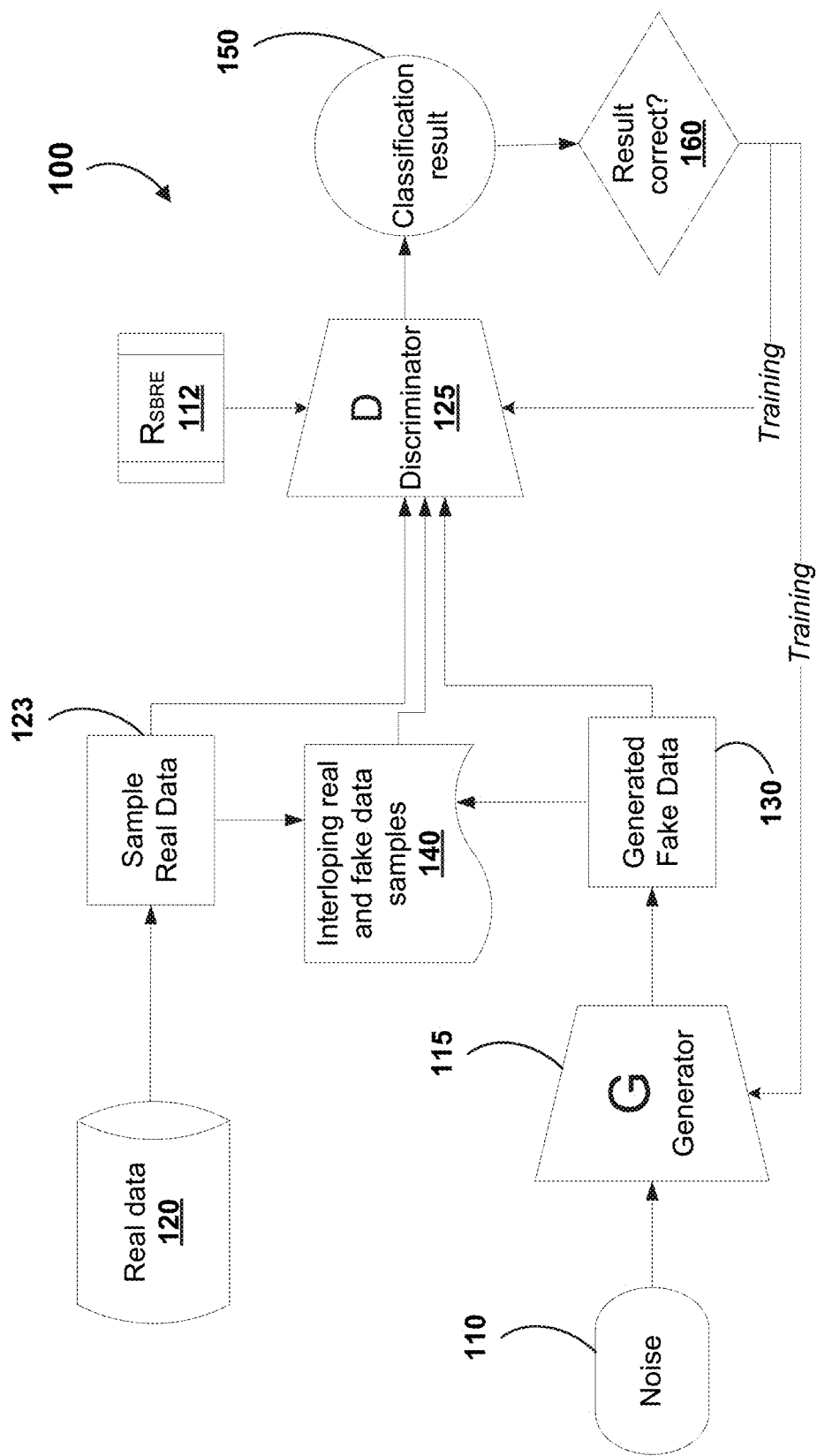
Figure 2:
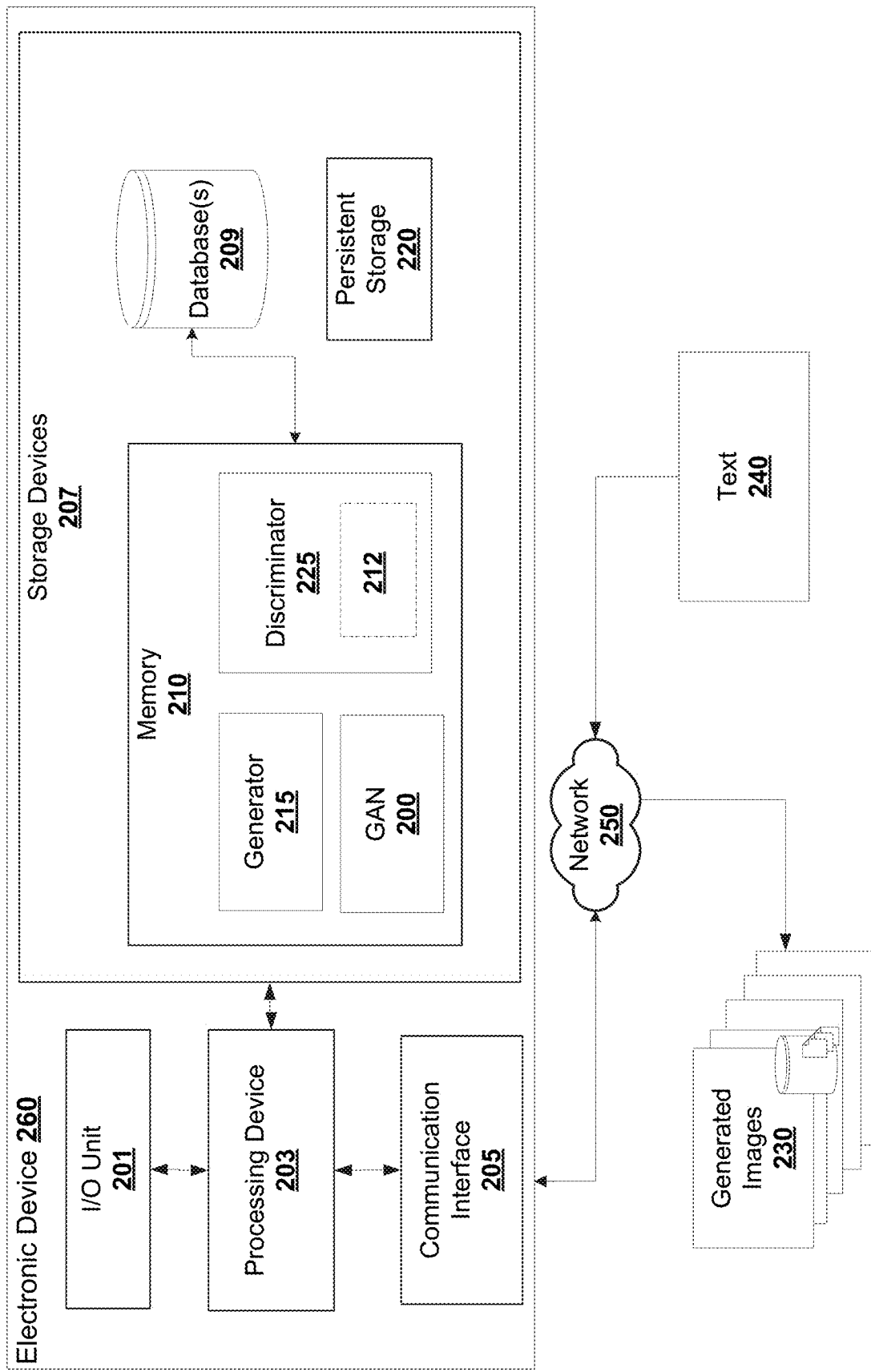
Figure 3:
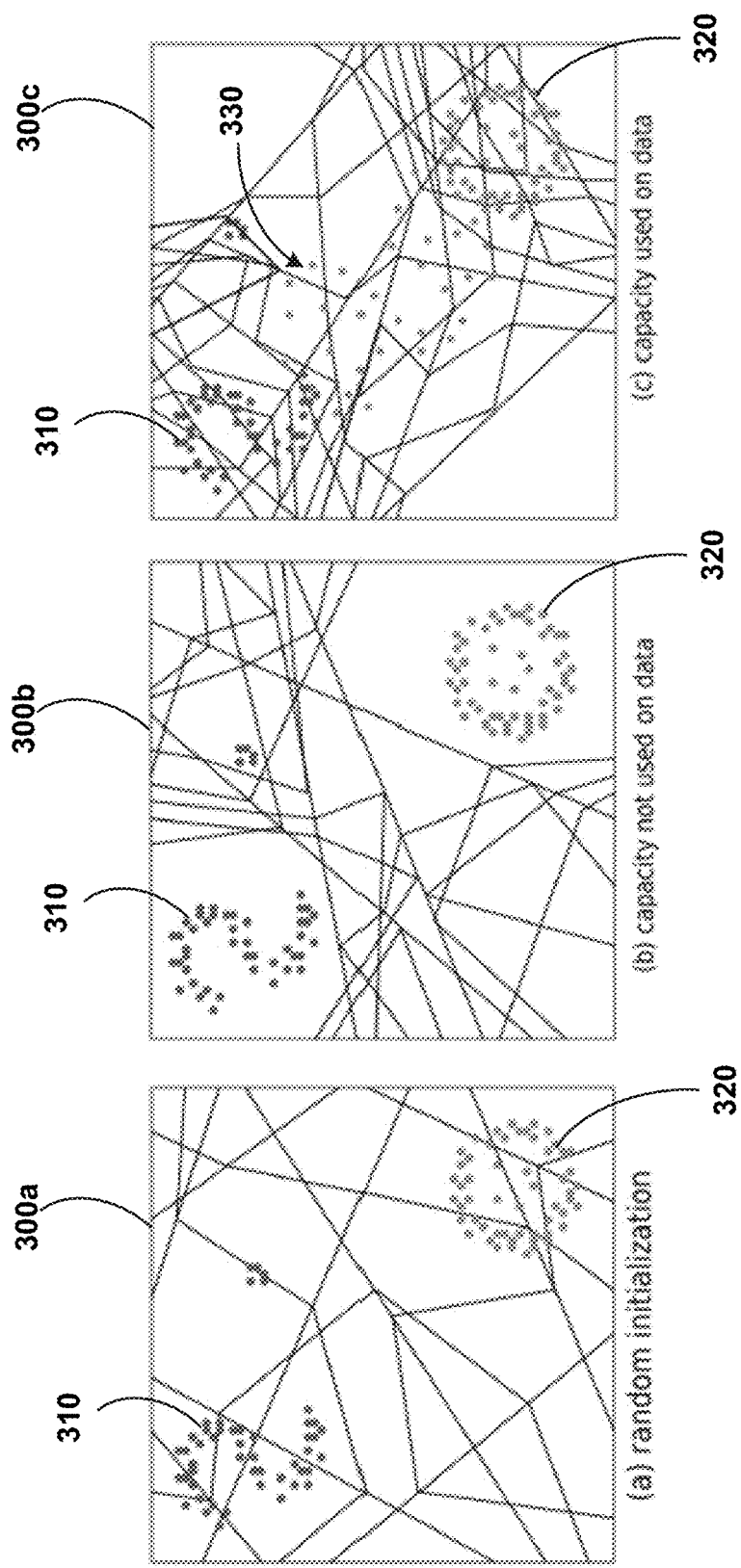
Figure 4:
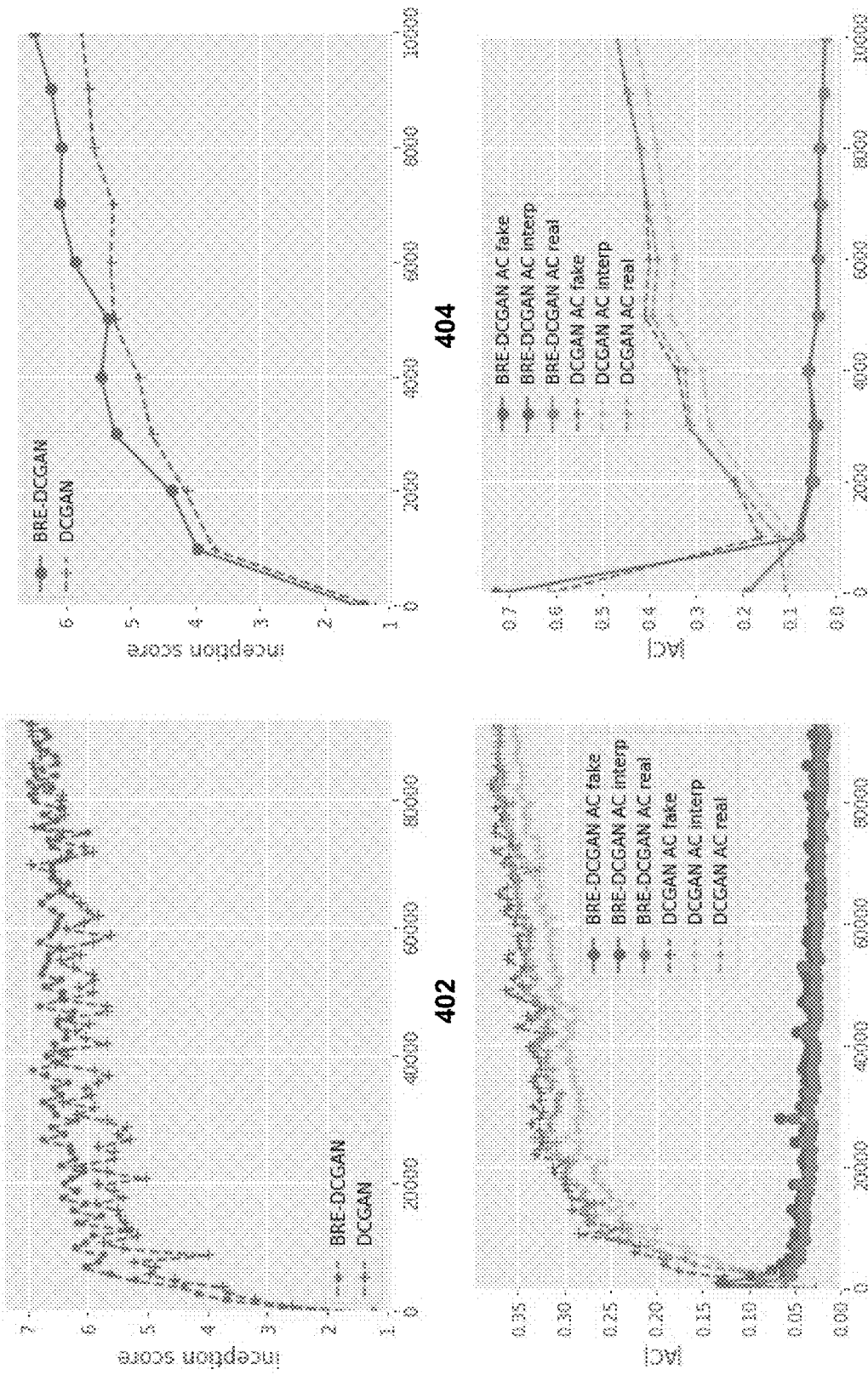
Figure 5:
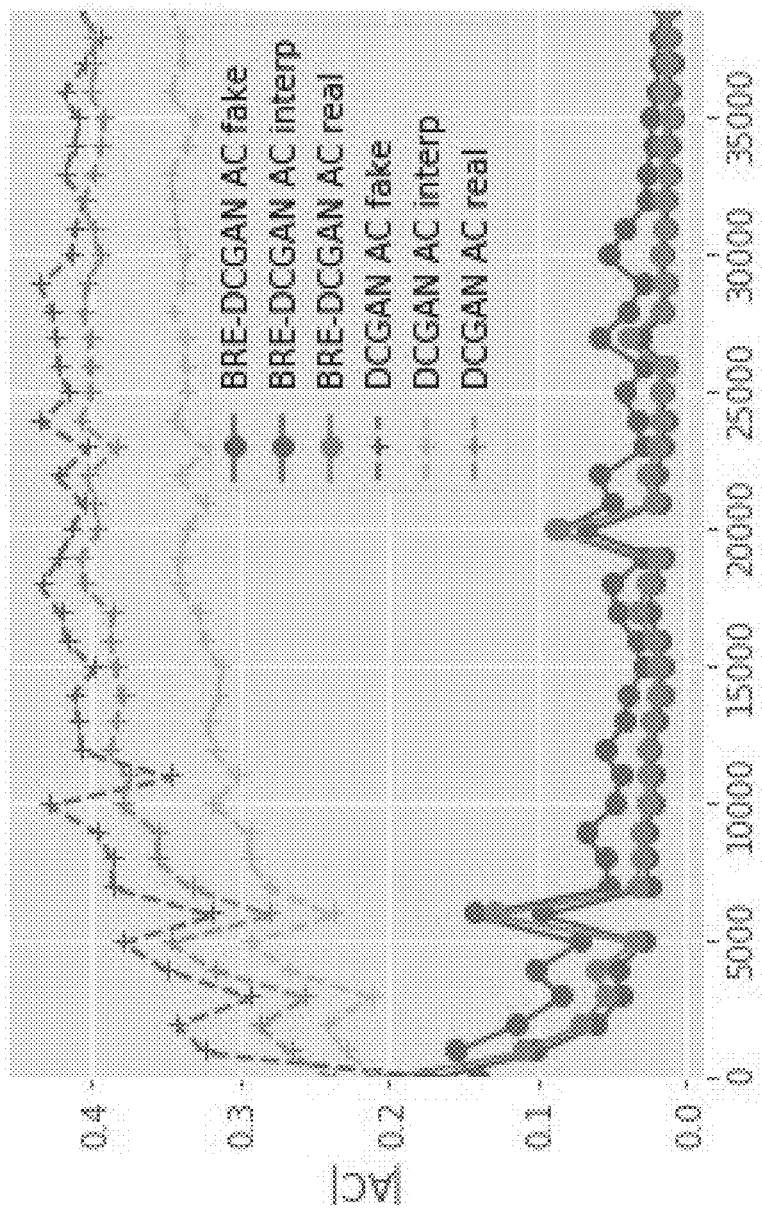
Figure 6:
Figure 6:
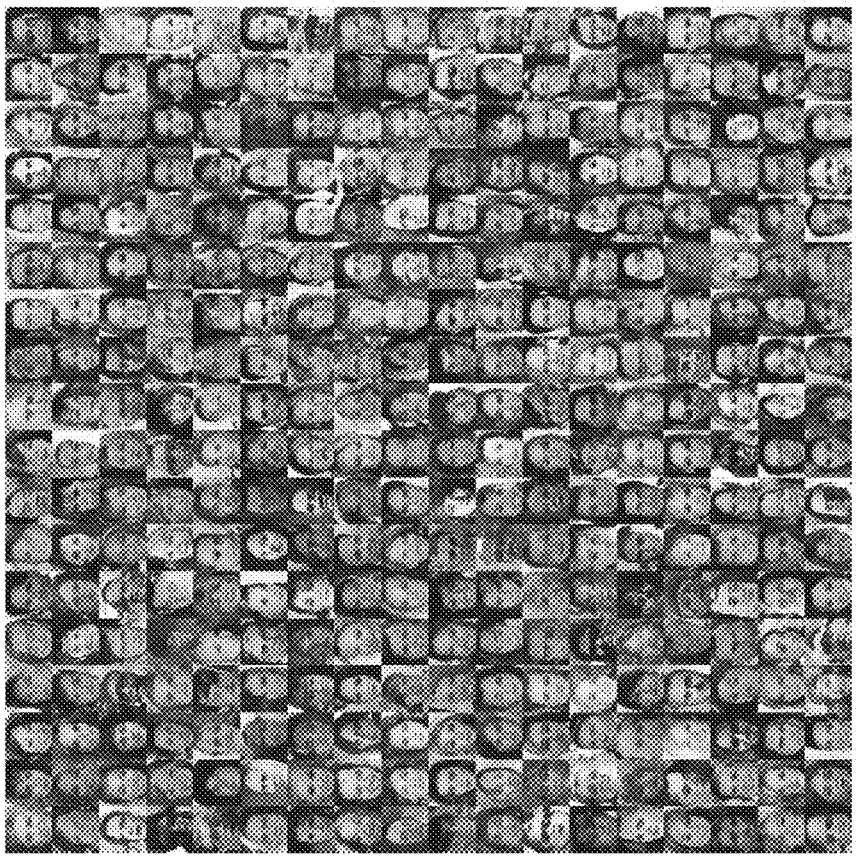
Figure 7:
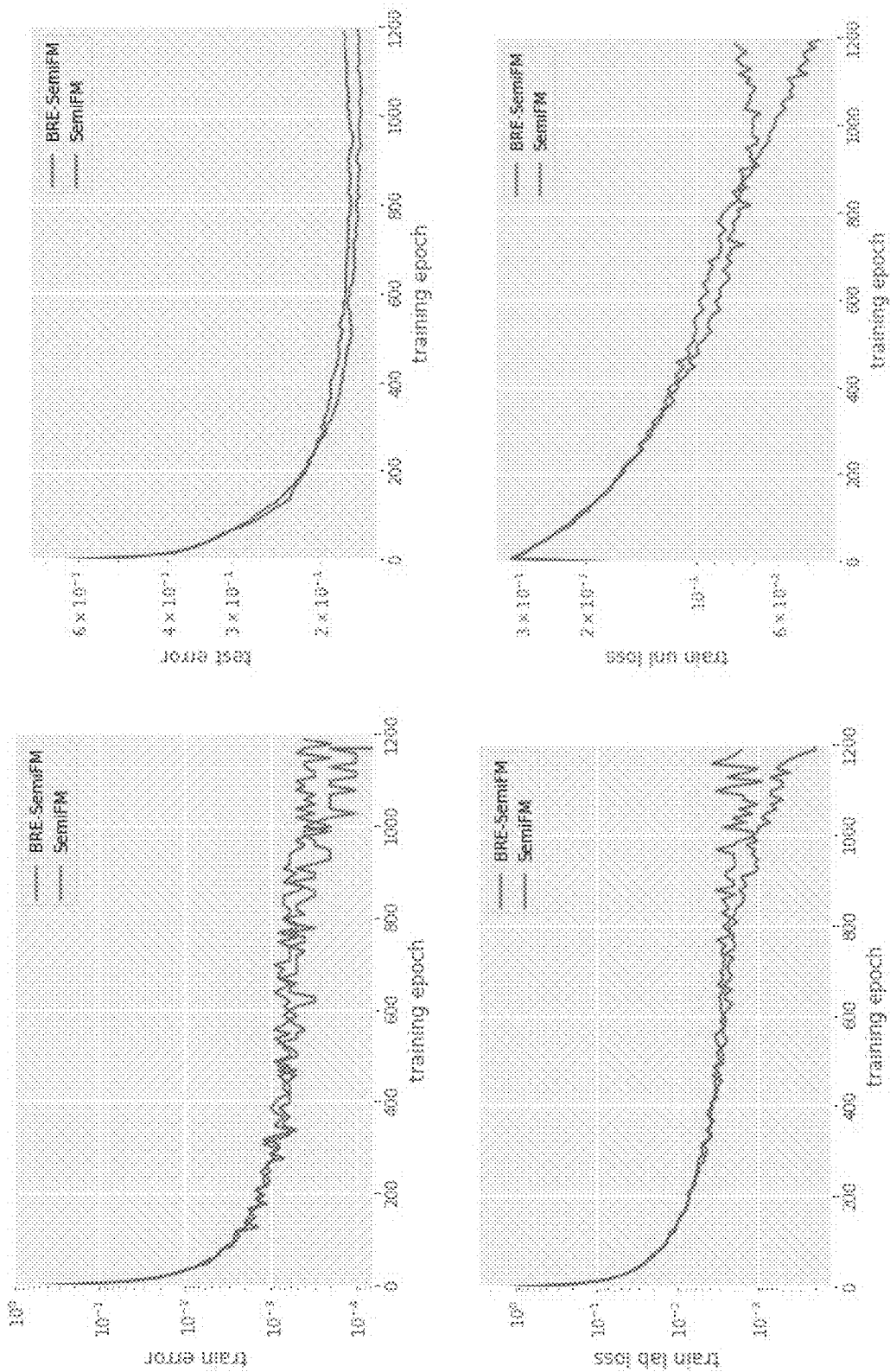
Figure 8:
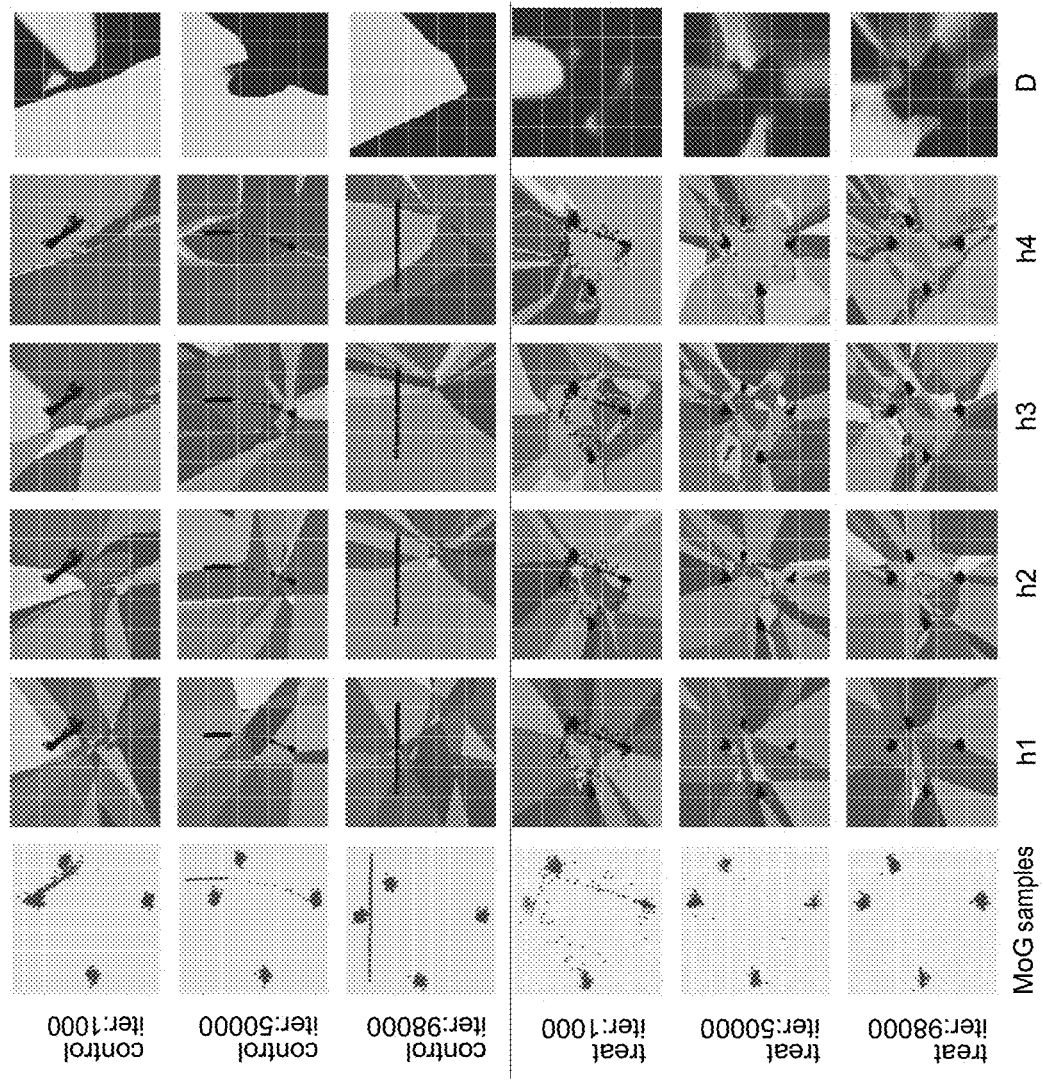
Figure 9:
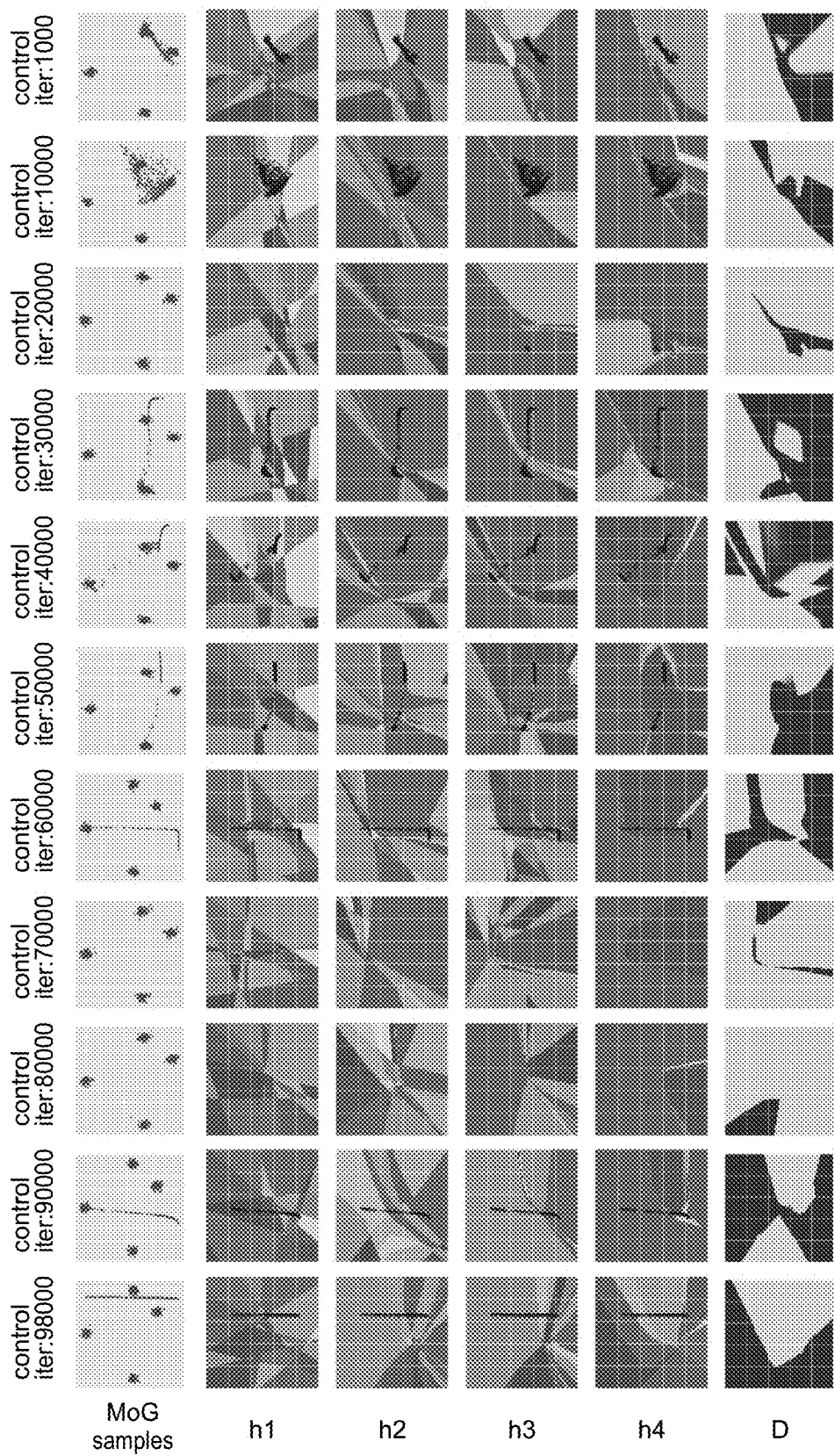
Figure 10:
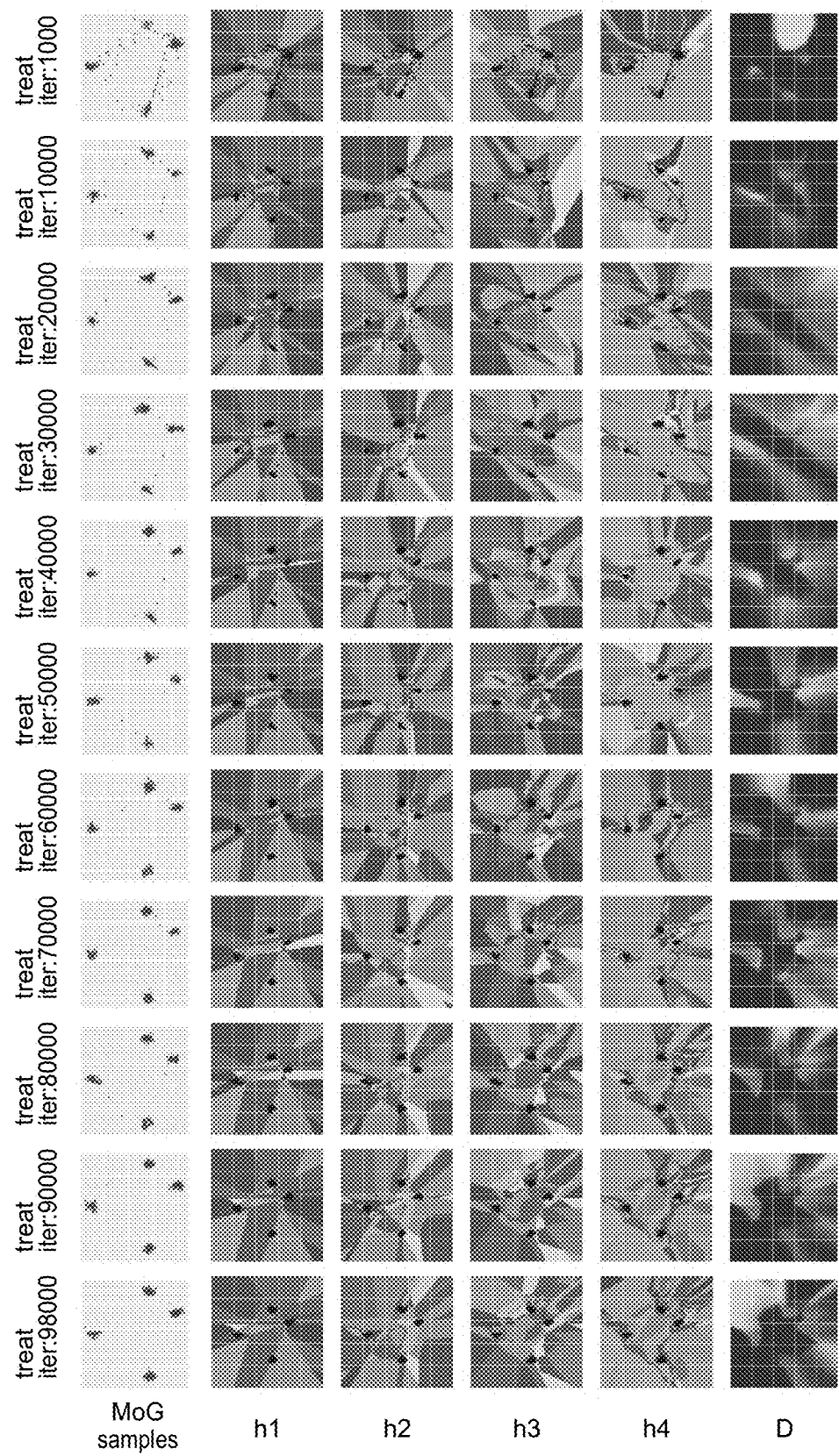

Embodiments will now be described, by way of example only, with reference to the attached figures, wherein in the figures:

FIG. 1 is an example schematic diagram of a generative adversarial network in training in accordance with an example embodiment;

FIG. 2 is an example schematic diagram of a generative adversarial network being used to generate images based on a text document in accordance with an example embodiment;

FIG. 3 illustrates example capacity maps of a Discriminator;

FIG. 4 shows inception scores and Regularizer values throughout training;

FIG. 5 shows inception scores and Regularizer values;

FIG. 6 shows Regularizer values throughout training on Celeba and samples at iteration 10K;

FIG. 7 shows inception scores and Regularizer values when BRE Regularizer is placed on every other second layer;

FIG. 8 shows a BRE Regularizer's effect on 2D mixture of Gaussian data;

FIG. 9 shows more results on fitting 2D Mixture of Gaussian on the control group; and FIG. 10 shows more results on Fitting 2D Mixture of Gaussian on the treat group.

DETAILED DESCRIPTION

1—Generative Adversarial Networks

Generative Adversarial Networks or GANs may learn from unlabeled data by engaging a generative model (G) in an adversarial game with a discriminator (D). GANs may implement unsupervised learning of complex high dimensional data. GANs may be used for applications of image data. GANs may be used for predictive representation learning and reinforcement learning. However, some existing challenges in GANs training may impede their wider applications in new data domain and as building blocks in other models. Some architectures and techniques may have reduced extreme failures where all generated data collapse to one or a few points, and G and D heavily oscillate. For example, subtle mode collapse where GANs fail to capture some variations in data may exist; GANs need to be trained faster and in a more robust manner; and stable training is desired so that GANs can be easily trained on new domains or new architectures.

GANs are a class of neural networks used in unsupervised machine learning. GANs can be implemented by a system of two neural networks contesting with each other in a zero-sum game framework, for example. One network generates candidates (generator) and one network evaluates them (discriminator).

FIG. 1 illustrates a schematic of an example GAN 100 in training with a Regularizer 112. Regularization is a process of introducing additional information in order to solve an ill-posed problem or to prevent overfitting. Regularization is a process that applies to objective functions in ill-posed problems formulated as optimization problems. A Regularizer may be implemented using software or hardware, such as program code, to define a regularization term. The program code can be stored in memory and can be executable by a processor. An example use of regularization is in the field of classification in order to learn classifiers.

A GAN 100 as shown may include a Generator (G) 115 and a Discriminator (D) 125. Sample real data 123 from real data source 120 may be fed into D 125. Noise 110 may be transmitted as input to a Generator 115 to generate fake data 130, which then may be fed into Discriminator 125. Interloping data samples 140 may be generated based on sample real data 123 and fake data 130, and may be a third input source to D 125. D 125 is configured to classify each input data as either real or fake and generating a classification result 150 as an output. The classification result 150 may be correct (i.e., D has recognized real data input as real, or fake data input as fake), or may be incorrect (i.e., D has recognized real data input as fake, or fake data input as real). The determination of whether the classification result 150 is correct or not, at step 160, is then fed back to G 115 and D 125, to encourage G to generate better fake data that is as close to real data as possible, and to encourage D to generate better classification result 150.

In some embodiments, generated fake data 130 may be unlabelled data, as the data is not classified when it is fed into D 125.

In some embodiments, real sample data 123 may include both unlabelled and labelled data. In some embodiments, real sample data 123 may include only unlabelled data.

In one embodiment, one or more Regularizer 112 may be connected to or integrated with D 125 to sample real data 123 and/or generated fake data 130. The Regularizer 112 may be attached to D during the training, and may be turned on only when the D 125 receives input from fake data 130 or the interpolating data samples 140. That is, Regularizer 112 may direct the resources of D 125 on generated fake data 130 and interpolation 140 between real and fake data. More rigorously, the Regularizer 112 may encourage each hidden unit in a layer to have high entropy and encourage the pairwise independence between the hidden units in a layer, on generated fake data 130 and interpolation 140 between real and generated fake data.

In some embodiments, Regularizer 112 may be implemented within D 125. In some embodiment, Regularizer 112 is not applied to real data 123. In other embodiments, Regularizer 112 can also be turned on for the input of real data 123.

For instance, a Regularizer 112 may cause D 125 to properly use its capacity, which may encourage hidden representations of D to have high entropy. A Regularizer 112 may reduce subtle mode collapse and encourage sample diversity across a wide range of architectures and hyperparameters. With a Regularizer 112, training can be stable with a learning rate that is 10 to 50 times larger than current ones used in the state of art. Instead of training D 125 for a fixed number of steps, in one embodiment, adaptive number of steps for training D 125 may be adopted until convergence, bridging the practice of GAN closer to the actual theory. In some embodiment, there may be improved semi-supervised learning results when using the Regularizer, which is described in great detail below.

In some embodiments, GANs 100 including Regularizers 112 may be implemented as digital circuit, analog circuit, or integrated circuit. For example, GANs may be implemented through field-programmable gate arrays (FPGAs). Training or executing GANs with a vast amount of data would typically require a significant amount of computing power due to the complexity of GANs and the amount of input data required.

With the Regularizer 112, GAN 100 may be trained in a faster and more robust manner, leading to reduced computational complexity and increased efficiency in allocating computing resources during training of a neural network. This may be achieved by better allocating and directing D's finite parameter resources on real and generated data.

Regularizer 112 may be configured to better allocate a Discriminator's capacity and computing resource, therefore, Regularizer 112 may lead to a greater learning rate of GAN 100. In some embodiments, Regularizer 112 achieves the same generated sample quality in an earlier epoch, with the same learning rate, so that the GAN 100 under training converges faster. Regularizer 112 may encourage the Discriminator 125 to allocate its capacity throughout the space uniformly. Compared to a Discriminator that allocate capacity unevenly (e.g. a Discriminator 125 without Regularizer 112), Regularizer 112 allows better coverage of space when the capacity of D 125 remains the same. Adding Discriminator capacity requires more computational resource, therefore Regularizer 112 help to reduce and allocate computational resource in an more efficient manner.

Regularizer 112 also may encourage G 115 to generate fake samples 130 to explore and fit different modes of the real samples 123, thus better capture variation in the real data 120, 123.

In some embodiment, GAN 100 may be trained in a centralized system. In other embodiments, GAN 100 may be trained in distributed system implemented with a distributed architecture.

FIG. 2 shows an example schematic of electronic device 260 implementing an example GAN 200. In this example, the GAN 200 can be used to generate images 230 based on text input 240. A processing device 203 can execute instructions in memory 210 to configure Generator 215, Discriminator 225. In some embodiments, the processing device 203 can execute instructions in memory 210 to configure the Regularizer 212 during a training or refining phase. A processing device 203 can be, for example, any type of general-purpose microprocessor or microcontroller, a digital signal processing (DSP) processor, an integrated circuit, a field programmable gate array (FPGA), a reconfigurable processor, or any combination thereof.

GAN 200 may be, in some embodiments, executed by the processor 203 to generate images 230 based on text documents 240 over a network 250. For example, text 240 may read "a cat has two emerald eyes and a grey body with four black paws." The electronic device 260 implementing the GAN 200 may generate, based on its neural network layers trained with Regularizer 212, a cat with two green coloured eyes and a grey body with four black paws.

In some embodiments, once GAN 200 is properly trained, Regularizer 212 is no longer required for execution of GAN 200 to perform one or more tasks such as image generation. In these cases, Regularizer 212 may be turned off.

Memory 210 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 207 include memory 210, databases 209, and persistent storage 220.

Each I/O unit 201 enables GAN 200 to interconnect with one or more input devices, such as a keyboard, mouse, camera, touch screen and a microphone, or with one or more output devices such as a display screen and a speaker.

Each communication interface 205 enables GAN 200 to communicate with other components over network 250, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WIMAX), SS7 signaling network, fixed line, local area network, wide area network, and others, including any combination of these.

Storage devices 207 may be configured to store information associated with GAN 200, such as instructions, rules associated with the Generator and Discriminator, and etc. Storage device 207 and/or persistent storage 220 may be provided using various types of storage technologies, such as solid state drives, hard disk drives, flash memory, and may be stored in various formats, such as relational databases, non-relational databases, flat files, spreadsheets, extended markup files, etc.

2—Rectifier Net Capacity Usage and Effects on GAN

The role of model capacity of a Discriminator 125 in training generative adversarial networks (GANs) may be important. A discriminator D 125 with finite number of parameters has a limited capacity in distinguishing real data and the generator G's samples, such that increasing Discriminator's capacity is sometimes required to increase training speed or efficiency. However, increasing Discriminator's capacity is increasing burden on computational resources. The question on where and how D can utilize its limited capacity effectively is being addressed by embodiments described herein.

Embodiments described herein may propose a Regularizer 112 for training GANs, which provides extra guidance for discriminator to allocate its capacity. Typically, the Discriminator may use rectifier as its activation function. For example, the rectifier is an activation function defined as the positive part of its argument:

$$f(x) = x^+ = \max(0, x),$$

where x is the input to a neuron of the rectifier neural network.

The number of activation patterns may be a good notion for measuring model capacity, especially for rectifier networks. Note that the number of activation patterns of a rectified network may correspond to the number of piecewise linear regions the network cuts the pixel space into. Intuitively, for a fixed region in the pixel space, how much capacity the discriminator D put into to distinguish the real data and the generated data can be approximately measured by the number of linear piece in the region. As illustrated in FIG. 3, the discriminator D essentially defines a piecewise linear loss function. As such, the feedback information for the generator G is essentially a piecewise constant function, where each constant represents the slope of the corresponding local linear region of D. That is, G sees the world via a kaleidoscope that is $\nabla_x D(x)$.

In some embodiments, a training method implemented by an electronic device to direct D's finite parameter resources on real and generated data is provided. In other words, not only should D do well on its classification task, but it also needs to tell apart each real and generated sample in distinct ways. This may be important for GANs, because D's role is to learn all features from real data and pass them to G via $\nabla_x D(x)$, which also distinguishes D's role from regular supervised learning tasks where irrelevant features for the labels can be forgotten. Moreover, the number of parameters for neural nets may be a very weak notion for model capacity. A finer notion for measuring capacity, particularly suited for rectifier nets, is activation pattern.

A motivation of a proposed solution starts with an observation that during the training of GAN, the generator G only receives information about real data distribution and its implicit manifold indirectly through $\nabla_x D(x)$. However, in unsupervised learning setting, the task of the discriminator D is solely to separate real samples from the generated fake ones. Therefore, D has no incentive to allocate its capacity in the most desired way. See FIG. 3 for illustration. When real and fake data are far apart in the early stages of the training or when the generator collapses into some particular modes, the discriminator D may assign all the generated fake samples to a small number of linear pieces, thus incapable to prevent the modal collapses in the training of GANs. Moreover, the discriminator D can allocate its model capacity to tell apart the generated fake samples from the real ones in distinct ways, and not waste the capacity on the regions where there is no data. Since activation pattern corresponds to number of piecewise linear regions D cuts into, each piecewise linear region should contains as few data points as possible. As data points x lie in different regions, $\nabla x\, D(x)$ are likely to be diverse. Then the generator G in turn can receive diverse learning signals from $\nabla x\, D(x)$. It is in this sense that model capacity usage of the discriminator D is encouraged by embodiments described herein. Henceforth, activation pattern may be used as a measure on where and how the discriminator D uses its model capacity.

FIG. 3 shows capacity usage of Discriminator D in different scenarios. D (a rectifier net) may cut the input space into convex polytopes and on each region it may be a linear function. The proposed Regularizer 112 may be applied on fake data 320 and region in between real and fake data 320, together with auto-encoding or other auxiliary tasks on the real data 310 may improve GAN training.

Graph 300a shows that D uniformly spreads its capacity in the input space, but does not have enough capacity to distinguish all subtle variation within a data distribution. Graph 300b shows that D uses its capacity in the region with no data; while real and fake data are correctly separated, variations within real data distribution are not represented by D, so cannot possibly be communicated to G if this degeneracy persists through training; meanwhile all fake points in the same linear region passes the same gradient information to G, even if they are visually distinct. Graph 300c shows that D spends most capacity on real data 310 and fake data 320, but also in region 330 where G might move its mass to in future iteration.

In GAN training, G receives information about real data distribution and its implicit manifold indirectly through $\nabla_x D(x)$. Because typically D is a rectifier net, which computes a piecewise linear function, G learning essentially can only access information in the form of piecewise constant function. So where in the input space D uses its capacity, i.e.

which region is represented with more finer polytopes, determines what G can potentially learn, as FIG. 3 illustrates.

One potential way to mitigate the problem is to use a Bayesian neural net, whose model capacity away from data is not degenerate. However, computationally scalable deep Bayesian neural networks are still an active area of research and are not easy to use. Alternatively, auxiliary tasks can be used to regularize D's capacity usage. On real data manifold, this is generally easy. If the data has label, augmenting D with semi-supervised learning task improves GAN training stability and the resulting generative model. If the data domain has other structures, for instance order or context structure in many sequence data, they can be exploited to regularize the model capacity usage as well and should in principle improve GAN training. Finally, if there is no label, auto-encoding may be used as an auxiliary task on the real data distribution.

On the other hand, away from real data, encouraging D to use its capacity in a constructive way is non-trivial. Auto-encoding on fake data is a possibility, and has been explored in Energy Based GAN. However, auto-encoding requires capturing the data manifold, as fake data distribution changes during training process, the same finite capacity D has to constantly learn different data manifolds. This potentially hinders how well D can separate real from fake while capturing different variations within the real data distribution.

Therefore, in some embodiments, implementation of a Regularizer can prevent D from having degenerative capacity usage, while not imposing constraints that are too hard to achieve by finite capacity D. The Regularizer may be applied on fake data (320 in FIG. 3) and region in between real and fake data (330 in FIG. 3), together with auto-encoding or other auxiliary tasks on the real data (310 in FIG. 3) may improve GAN training.

3—Binarized Representation Entropy

A Regularizer may encourage the hidden representation of different data points to be diverse. The Regularizer acts on the binarized activation pattern, and has two terms: the first term, $R_{ME}$, encourages individual hidden units to be on half of the time on average, to have high marginal entropy; the second term, $R_{AC}$, encourages pairs of hidden units to have low activation correlation. After defining the terms mathematically below, their forms as a necessary condition for maximizing the representation entropy is shown in Sec. 3.2. Then minimizing the proposed Regularizer leads to a lower bound on the joint entropy of the binarized representation is shown in Sec. 3.3.

3.1—the Soft Binary Representation Entropy Regularizer

A formal definition of the soft binary representation entropy Regularizer is presented herein. Given a mini-batch, $\{x_1, \ldots, x_K\}$ of size K, let $h_i \in \mathbb{R}^d$ be the immediate pre-nonlinearity activity of data point $x_i$ in a mini-batch on a particular layer of d hidden units, represented as a column vector.

Let $$s_i = \text{sign}(h_i) := \frac{h_i}{|h_i|} \in \{\pm 1\}^d$$

be the sign function, where $|\cdot|$ is entry-wise absolute value. Assume that the sign function $s_i$ of each data point $x_i$ is an independent sample of $(U_1, \ldots U_d)$, where $(U_1, \ldots, U_d)$, denote a multivariate Bernourlli random vector with parameters $(p_1, \ldots, p_d)$. Also denotes its joint distribution function by $\mathbb{P}$ and its kth marginal Bernoulli distribution function by $\mathbb{P}_k$. We would like to construct a Regularizer that encourages $\mathbb{P}$ to have larger entropy. Ideally, one could use an empirical estimate of the entropy function as a desired Regularizer. However, estimating the entropy of a high-dimensional distribution based a small number of samples has been well known to be difficult, especially with a small mini-batch size.

In one embodiment, a simple Regularizer $R_{SBRE}$ is implemented, which, as shown below, encourages the large entropy of $\mathbb{P}$ in a weak manner. A proposed Soft Binary Representation Entropy (SBRE) Regularizer $R_{SBRE}$ applied on a given layer may comprise two terms defined on $\{s1, \ldots, s_k\}$: $R_{SBRE} = R_{ME} + R_{AC}$, where $$R_{ME} = \frac{1}{d}\sum_{k=1}^{d} \bar{s}_{(k)}^2; \text{ and}$$

$$R_{AC} = \text{avg}_{i \neq j} |s_i^T s_j|/d.$$

Here $\bar{s}_{(k)}$ is the average of the sign function on the $k^{th}$ hidden unit across the mini-batch, and $\text{avg}_{i \neq j}$ denotes the average taken over all possible pairs of (i; j) such that i≠j. Thus $R_{ME}$ can be interpreted as an empirical estimate of $$\frac{1}{d}\sum_{k=1}^{d} \mathbb{E}[U_k]^2,$$

and $R_{AC}$ as an empirical estimate of $\mathbb{E}[|\Sigma_{k=1}^d U_k \tilde{U}_k|]$.

It is straightforward that the maximum entropy of $\mathbb{P}$ is achieved when $p_k = \frac{1}{2}$ and $(U_1, \ldots, U_d)$ are mutually independent. Intuitively, $R_{ME}$ encourages $p_k$ to be close to $\frac{1}{2}$, while $R_{AC}$, as shown in Section 3.3, encourages $(U_1, \ldots, U_d)$ to be pairwise independent. Although pairwise independence is weaker than mutual independence, it is shown in Section 3.3 that pairwise independence guarantees a lower bound for the entropy of the joint distribution $\mathbb{P}$.

In practice, due to the degenerate gradient of the sign function, $s_i$ in $R_{ME}$ may be replaced by its smooth approximation.

$$R_{AC} \quad a_i = \text{softsign}(h_i) := \frac{h_i}{|h_i| + \varepsilon}$$

may be also be allowed a soft margin term, $$R_{AC} = \text{avg}_{i \neq j} \max(0, |a_i^T a_j|/d - \eta), \text{ where } \eta = 3\sqrt{1/d}.$$

as Discussion of the choice of $\epsilon$ is at end of Section 3.

3.2 Maximum Entropy Representation has $R_{SBRE} \approx 0$

In this section it is shown that $R_{SBRE} = 0$ may be a necessary condition for $\mathbb{P}$ to achieve maximum entropy. Note that the maximal entropy that the binarized representation on a layer can attain, absent of constraints from any task that the neural network has to perform, is to have the $U_k$'s mutually independent with $\mathbb{E}[U_k]=0$ Therefore, the average signed activation $\bar{s}_k$ is approximately zero, and so is $R_{ME}$.

For $R_{AC}$, consider $\Sigma_{k=1}^d M_k$, where $M_k=U_k\tilde{U}_k$, and $\tilde{U}_k$ is a random sample of $\mathbb{P}_k$ that is independent to $U_k$. Note that given $\mathbb{P}_k$ being Bernoulli(0:5) and $U_k$'s are mutually independent, $M_k$'s are mutually independent and have the distribution of Bernoulli(0:5) as well. Therefore by the Central Limit Theorem, $$\Sigma_{k=1}^d M_k$$

$$\frac{\sum_{k=1}^d M_k}{d} = \frac{s_i^T s_j}{d}$$

the distribution of converges in distribution to the Gaussian distribution $N(0; d)$. Therefore, given sufficiently large d, the $\eta=c\sqrt{1/d}$ distribution of is approximately $N(0, 1/d)$. A choice for margin threshold may be where c is chosen as c=3 to leave 99.7% of i, j pairs unpenalized in the maximum entropy case.

Note that the expectation of $R_{AC}$ under the maximum entropy assumption is not zero, but a small number on the order of 1 e−3.

3.3 Minimizing the $R_{SBRE}$ SBRE Regularizer to the Entropy of Multivariate Bernoulli Distribution It is shown that minimizing $R_{SBRE}$ is equivalent to enforcing the maximum entropy of each $\mathbb{P}_k$ and the pairwise independence of $(U_1, \ldots, U_d)$. To see that, first note that each summand $\bar{s}_k$ in $R_{ME}$ is the empirical estimate of $2\rho_k-1$, the mean of the marginal distribution $\mathbb{P}_k$. Thus minimizing leads to $p_k=1/2$, i.e. maximizing the entropy of $\mathbb{P}_k$. Moreover, the Regularizer $R_{AC}$ is essentially equivalent to minimizing. The $(s_i^\tau s_j)^2$ following proposition shows that given $U_k$ being zero-mean, $R_{AC}$ tends to enforce Cov $(U_k;U_t)=0$, i.e. $U_k$'s are pairwise independent.

Proposition 3.1.

Let $U=(U_1, \ldots, U_d)$ be a zero-mean multivariate Bernoulli vector of $\mathbb{P}$, and $\tilde{U}=(\tilde{U}_1, \ldots, \tilde{U}_d)$ denotes another random vector of $\mathbb{P}$ that is independent to U. Then $$\mathbb{E}[(U\tilde{U})^2] = \mathbb{E}\left[\left(\sum_{k=1}^d U_k\tilde{U}_k\right)^2\right] = d + \sum_{i \neq j} \text{Cov}(U_k, U_j)^2.$$

Proof. Let $M_k=U_k\tilde{U}_k$. Then $$\mathbb{E}\left[\left(\sum_{k=1}^d U_k\tilde{U}_k\right)^2\right] = \mathbb{E}\left[\left(\sum_{k=1}^d M_k\right)^2\right]$$

$$= \sum_{k=1}^d \mathbb{E}[M_k^2] + \sum_{k \neq j} \mathbb{E}[M_k M_j]$$

$$= \sum_{k=1}^d \mathbb{E}[U_k^2 \tilde{U}_k^2] + \sum_{k \neq t} \mathbb{E}[U_k \tilde{U}_k U_t \tilde{U}_t]$$

$$\stackrel{(1)}{=} \sum_{k=1}^d \mathbb{E}[U_k^2]^2 + \sum_{k \neq t} \mathbb{E}[U_k U_t]^2$$

$$\stackrel{(2)}{=} d + \sum_{k \neq t} \mathbb{E}[U_k U_t]^2$$

$$\stackrel{(3)}{=} d + \sum_{k \neq t} \text{Cov}(U_k, U_t)^2,$$

where Equation (1) is due the independence of U and $\tilde{U}$, Equation (2) is due to that $U_k^2=1$ with probability 1, and Equation (3) is because $\mathbb{E}[U_k]=0$.

Lastly, assuming the hidden units $U_k$'s are zero-mean and pairwise independent, the entropy of $\mathbb{P}$ satisfies $$H(\mathbb{P}) \geq \log(n+1).$$

Theorem 3.2.

Let $H_{min}(\mathbb{P})=-\log(\max_x \mathbb{P}(X=x))$. Also let $(U_1, \ldots, U_d)$ be pairwise independent random variable of Bernoulli(0.5). Then, $$H(\mathbb{P}) \geq H_{min}(\mathbb{P}) \geq \log(n+1).$$

3.4 Controlling the Softness of Soft-Sign Approximation $R_{SBRE}$ is defined on $$a_k = softsign(h_k) := \frac{h_k}{|h_k| + \epsilon},$$

so $\epsilon$ is a hyperparameter to be chosen. Too small, the nonlinearity becomes too non-smooth for stochastic gradient descent; too large, it fails to be a good approximation to the sign function for $R_{SBRE}$ to be useful. Furthermore, not only different layers could have different scales of $h_k$, hence requiring different $\epsilon$, during training the scale of h could change too. Therefore, instead of setting a fixed $\epsilon$, set $\epsilon=s \overline{|h_k|}$, where the averaging ranges over the d dimensions of the layer. In this way, softsign(•) is invariant with respect to any multiplicative scaling of $h_k$ in the forward pass of the computation; in the backward pass for the gradient computation, we do not backpropagate through $\epsilon$. In one embodiment, s is chosen such that s=1e−3, as empirically this usually makes 90% to 99% of units to have absolute value at least. 9.

3.5 Why Regularizing $\nabla_x D(x)$ Diversity May not Work

Because G receives training signal from D, so it might be tempting to add a Regularizer to enforce gradient directions $\nabla_x D(x_i)_i$ to be diverse. However, in rectifier networks, if two inputs share the same activation pattern, the input gradients located at the two points are co-linear, hence any gradient based learning with such diversity Regularizer would have difficulty pulling them apart. In general, unlike $R_{SBRE}$ which operates directly on both activated and non-activated path, input gradient Regularizer can only access information on the activated path in the network, so that it can only encourage existing non-shared activated path, but cannot directly create new non-shared activated path. In theory, other nonlinearities such as tan h might allow input gradient Regularizer to work, but they are very hard to train at the first place. In preliminary experiments, on tan h nonlinearity networks, input gradient diversity Regularizer with either cosine similarity or soft-sign based Regularizer like $R_{SBRE}$ may not work.

3.6—GAN Training with SBRE Regularizer

To regularize GAN training, $R_{SBRE}$ may be, in one embodiment, applied to the immediate pre-nonlinearity activities on selected layers of D. Therefore, if there is any normalization layer before nonlinearity, $R_{SBRE}$ needs to be applied after the normalization. Soft-sign is used for the Regularizer; while the nonlinearity or any other structure of the neural net is not modified. Recall from Sec. 3 that it is desired for D to spend enough capacity on both the real data manifold, the current generated data manifold by G, as well as having adequate capacity on regions where real or fake points are not observed but might be in future iterations. To enforce this, $R_{SBRE}$ may be applied on selected layers on generated mini-batch data, as well as random interpolation inbetween real and generated fake data.

Specifically, in one example embodiment, let $x_i$ and $\tilde{x}_i$ be real and a fake data points respectively, $\alpha_i \sim U(0,1)$ is sampled and $\hat{x}_i = \alpha_i x_i + (1-\alpha_i)\tilde{x}_i$, and apply $R_{SBRE}$ on selected layer representation computed on interpolated data points $\{\hat{x}_i\}$ as well.

Technically $R_{SBRE}$ can be applied on any rectifier layer before the nonlinearity. However, having it on the last hidden rectifier layer before classification might hinder D's ability to separate real from fake, as the high entropy representation encouraged by $R_{SBRE}$ might not be compatible with linear classification. Therefore, for unsupervised learning, $R_{SBRE}$ may be applied on all except the last rectifier nonlinearity before the final classification; for semi-supervised tasks using the K+1-way classification setup, may apply $R_{SBRE}$ only on $2^{nd}$, $4^{th}$ and $6^{th}$ convolutional layer, leaving 3 nonlinear layers un-regularized before the final softmax.

4—Experiments

4.1 Improving Inception Score on CIFAR10

4.2 Semi-Supervised Learning

Referring now to FIG. 8, which shows a BRE Regularizer's effect on 2D mixture of Gaussian data. The top half of the figure contains results from a control (no BRE Regularizer) experiment. The bottom half of the figure contains results regularized by BRE. Within each setting, each row represents one iteration. This figure shows the beginning, middle, and the end of the training process. The first column shows real data points (blue) and generated data points (red). The second to fifth columns show hidden layers 1 to 4. Pixels with the same color has the same binary activation pattern. The last column shows the probability output by D. The BRE Regularizer is added on h3.

In FIG. 8, h1-h4 show the input space linear region defined by different binary activation patterns on each layer, where each colour corresponds to one unique binary pattern; the last column shows probability of real data according to D; BRE Regularizer is applied on h2. G is 4-layer (excluding noise layer) MLP with ReLU hidden activation function, and tan h visible activation; D is 5-layer MLP with LeakyRelu (0.2). Both D and G has 10 units on each hidden layer, no batch or other normalization is used in D or G, no other stabilization techniques are used; lr=0.002 with adam(0.5, 0.999), and BRE Regularizer weight 1; both lr and BRE weight linearly decay to over iterations to 1e−6 and 0 respectively.

FIG. 9 shows more results on fitting 2D Mixture of Gaussian on the control group.

FIG. 10 shows more results on fitting 2D Mixture of Gaussian on the treat group.

FIG. 4 illustrates graphs 402, 404, 406, 408 for inception scores and Regularizer values throughout training: (left column) lr=2e−4 and 1 D update for 1 G update, lr for both D and G annealled to 1e−6 over 90K G-updates; (right column) lr=2e−3 and 3 D update for 1 G update, lr for both D and G annealled to 1e−6 over 10K G-updates; (top row) inception scores during training; (bottom row) AC term of BRE on fake, interpolated and real data. Even though BRE is not applied on real data, model still allocates enough capacity if BRE is applied on fake and interpolated data. Both models are DCGAN for G and D with batchnorm but no other stabilization techniques.

TABLE 1

| 2 | d_width_factor: 1 | d_width_factor: 2 | d_width_factor: 4 | d_width_factor: 8 |
|---|---|---|---|---|
| mean | −0.012558 | −0.095822 | −0.144102 | 0.001150 |
| min | −0.154278 | −0.254397 | −0.203341 | −0.135540 |
| 25% | −0.075591 | −0.208932 | −0.183847 | −0.071670 |
| 50% | 0.003096 | −0.163468 | −0.164353 | −0.007801 |
| 75% | 0.058301 | −0.016534 | −0.114482 | 0.069495 |
| max | 0.113507 | 0.130399 | −0.064611 | 0.146790 |
| std | 0.199080 | 0.163669 | 0.122830 | 0.243098 |
| min | −0.205273 | −0.176051 | 0.010553 | −0.065005 |
| 25% | 0.076265 | 0.045827 | 0.142776 | 0.159023 |
| 50% | 0.257582 | 0.166419 | 0.284752 | 0.415546 |
| 75% | 0.276390 | 0.244085 | 0.313710 | 0.476366 |
| max | 0.444160 | 0.358119 | 0.371657 | 0.655426 |

Table 1 above shows distribution of inception score improvement: initial transient phase vs. convergence phase for different D size factor while holding G size constant. 1 D update for 1 G update with lr=2e−4, initial transient phase before 5K iteration (see graph 406 FIG. 4). Inception scores are averaged across three repeated runs; With BRE Regularizer, GAN training makes less aggressive progress initially during the transient phase, but converges to better solution later.

FIG. 5 shows a graph of inception scores and Regularizer values.

FIG. 6 shows Regularizer values throughout training on Celeba and samples at iteration 10K: (left) BRE-DCGAN (right) DCGAN; BRE-DCGAN results are visibly more diverse. By adding BRE Regularizer in h2, h3, and h4, the input domain is divided into more pieces. This indicates the better usage of D's model capacity.

FIG. 7 shows inception scores and Regularizer values when BRE Regularizer is placed on every other second layer, starting from the $2^{nd}$ until $4^{th}$ layers before the classification layer. Regularizer weight is 0.01 and not decayed.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. For example, the programmable computers may be a server, network appliance, set-top box, embedded device, computer expansion module, personal computer, laptop, personal data assistant, cloud computing system or mobile device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may relate to various types of computing applications, such as image processing and generation applications, computing resource related applications, speech recognition applications, video processing applications, semiconductor fabrication, and so on. By way of illustrative example embodiments may be described herein in relation to image-related applications.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

What is claimed is:

1. An electronic device for a neural network architecture trainable from unlabeled data; the electronic device comprising:
   at least one processor; and
   a non-transitory computer-readable medium storing data, and computer-readable instructions which when executed by the at least one processor, configure the at least one processor for:
      providing a generative adversarial network (GAN) architecture including:
         a generator,
         a discriminator comprising layers of hidden units, and
         a regularizer connected to or integrated with the discriminator, wherein when enabled, the regularizer is configured to encourage individual hidden units of a given layer of the discriminator to be on for a fraction of time on average, and to encourage pairs of hidden units of the given layer to reduce activation correlation;
      receiving a plurality of training cases;
      training the generative adversarial network architecture, based on the plurality of training cases, the training including:
      enabling the regularizer to configure the discriminator to allocate a model capacity evenly;
      receiving an unlabeled data set;
      processing the unlabeled data set with the trained generative adversarial network architecture; and
      generating a fake output data set based on the processed unlabeled data set.

2. The electronic device of claim 1, wherein at least one of the generator and the discriminator is a neural network.

3. The electronic device of claim 1, wherein the discriminator is a rectifier network having an activation function defined as:

$$f(x)=x^+=\max(0,x),$$

where x is input to a neuron of the rectifier network.

4. The electronic device of claim 3, wherein the discriminator is configured to compute a piecewise linear function.

5. The electronic device of claim 4, wherein $$R_{ME} = \frac{1}{d}\sum_{k=1}^{d} \bar{s}_{(k)}^2; \text{ and}$$

$$R_{AC} = avg_{i \neq j}|s_i^T s_j|/d.,$$

where $\bar{s}_{(k)}$ is an average of the sign function on the $k^{th}$ hidden unit across generated data, $avg_{i \neq j}$ denotes an average taken over all possible pairs of (i; j) such that i # j, and d is a total number of hidden units in the given layer.

6. The electronic device of claim 1, wherein the regularizer is configured to encourage each piecewise linear region of the discriminator to contain as few data points as possible so that data points represented by x lie in different regions and that $\nabla_x D(x)$ is diverse, where $D(x)$ is represented by $x^+=\max(0, x)$.

7. The electronic device of claim 1 wherein the regularizer is configured to apply $R_{SBRE}$ on the given layer of the discriminator, $R_{SBRE}$ comprising two terms defined on {s1, . . . , SK}: $R_{SBRE}=R_{ME}+R_{AC}$; and wherein $R_{ME}$ is a function which encourages individual hidden units of the given layer to be on a fraction of time on average; and $R_{AC}$ is a function which encourages pairs of hidden units of the given layer to reduce activation correlation.

8. The electronic device of claim 1, wherein the plurality of training cases transmitted to the discriminator comprise interloped real and fake data.

9. The electronic device of claim 8, wherein the regularizer is applied to immediate pre-nonlinearity activities on one or more layers of the discriminator model.

10. The electronic device of claim 9, wherein the regularizer is applied on generated data and random interpolation inbetween real and generated fake data.

11. A computer-implemented method comprising:
   receiving, at at least one processor, a plurality of training cases for a generative adversarial network (GAN) architecture instantiated with the at least one processor, the GAN architecture including a generator, a discriminator comprising layers of hidden units, and a regularizer connected to or integrated with the discriminator, wherein when enabled, the regularizer is configured to encourage individual hidden units of a given layer of the discriminator to be on for a fraction of time on average, and to encourage pairs of hidden units of the given layer to reduce activation correlation;
   training the generative adversarial network architecture, based on the plurality of training cases, the training including:
   enabling the regularizer to configure the discriminator to allocate a model capacity evenly;
   receiving an unlabeled data set;
   processing the unlabeled data set with the trained generative adversarial network architecture; and
   generating a fake output data set base don the processed unlabeled data set.

12. The method of claim 11, wherein at least one of the generator and the discriminator is a neural network.

13. The method of claim 11, wherein the discriminator is a rectifier network having an activation function defined as:

$$f(x)=x^+=\max(0,x),$$

where x is input to a neuron of the rectifier network.

14. The method of claim 13, wherein the discriminator is configured to compute a piecewise linear function.

15. The method of claim 14, wherein $$R_{ME} = \frac{1}{d}\sum_{k=1}^{d} \bar{s}_{(k)}^2; \text{ and}$$

$$R_{AC} = avg_{i \neq j}|s_i^T s_j|/d.,$$

where $\bar{s}_{(k)}$ is an average of the sign function on the $k^{th}$ hidden unit across generated data, $avg_{i \neq j}$ denotes an average taken over all possible pairs of (i; j) such that i # j, and d is a total number of hidden units in the given layer.

16. The method of claim 11, wherein the regularizer is configured to encourage each piecewise linear region of the discriminator to contain as few data points as possible so that data points represented by x lie in different regions and that $\nabla_x D(x)$ is diverse, where $D(x)$ is represented by $x^+=\max(0, x)$.

17. The method of claim 11 wherein the regularizer is configured to apply $R_{SBRE}$ on the given layer of the discriminator, $R_{SBRE}$ comprising two terms defined on $\{s1, \ldots, SK\}$: $R_{SBRE}=R_{ME}+R_{AC}$; and wherein $R_{ME}$ is a function which encourages individual hidden units of the given layer to be on a fraction of time on average; and $R_{AC}$ is a function which encourages pairs of hidden units of the given layer to reduce activation correlation.

18. The method of claim 11, wherein the plurality of training cases transmitted to the discriminator comprise interloped real and fake data.

19. The method of claim 18, wherein the regularizer is applied to immediate pre-nonlinearity activities on one or more layers of the discriminator model.

20. The method of claim 19, wherein the regularizer is applied on generated data and random interpolation in between real and generated fake data.

21. An electronic device comprising:
one or more processors;
memory having stored thereon one or more programs configured to be executed by the one or more processors, the one or more programs including instructions for:
receiving a text string;
processing the text string using a generative adversarial network trained using a regularizer to configure a discriminator to evenly use its model capacity;
wherein the regularizer is defined as $R_{SBRE}$ applied on a given layer of the discriminator comprising two terms defined on $\{s1, \ldots, s_K\}$: $R_{SBRE}=R_{ME}+R_{AC}$;
wherein $R_{ME}$ is a function which encourages individual hidden units of the given layer to be on a fraction of time on average; and $R_{AC}$ is a function which encourages pairs of hidden units of the given layer to reduce activation correlation; and
generating an image based on the processed text string.

* * * * *